(12) United States Patent
Malloy

(10) Patent No.: US 10,914,327 B2
(45) Date of Patent: Feb. 9, 2021

(54) CLUTCH STACK WEAR SENSOR SYSTEM FOR A POWER TRANSMISSION DEVICE

(71) Applicant: Twin Disc, Inc., Racine, WI (US)

(72) Inventor: Ryan J. Malloy, Milwaukee, WI (US)

(73) Assignee: Twin Disc, Inc., Racine, WI (US)

( * ) Notice: Subject to any disclaimer, the term of this patent is extended or adjusted under 35 U.S.C. 154(b) by 94 days.

(21) Appl. No.: 16/035,080

(22) Filed: Jul. 13, 2018

(65) Prior Publication Data
US 2020/0018332 A1    Jan. 16, 2020

(51) Int. Cl.
*F16D 25/12* (2006.01)
*F16D 48/06* (2006.01)
*F15B 15/28* (2006.01)

(52) U.S. Cl.
CPC .......... *F15B 15/2846* (2013.01); *F16D 25/12* (2013.01); *F16D 48/06* (2013.01); *F16D 2500/3026* (2013.01); *F16D 2500/5023* (2013.01)

(58) Field of Classification Search
None
See application file for complete search history.

(56) References Cited

U.S. PATENT DOCUMENTS

| | | | | |
|---|---|---|---|---|
| 3,406,800 A * | 10/1968 | Buchanan | ............... | F16D 25/12 192/85.57 |
| 4,084,671 A * | 4/1978 | Ternehall | ............... | F16D 25/12 116/325 |
| 4,086,519 A | 4/1978 | Persson | | |
| 5,642,793 A * | 7/1997 | Ljøsne | ................. | F16D 25/126 192/30 W |
| 5,758,758 A * | 6/1998 | Friedrich | ............... | B60K 17/02 192/30 W |
| 7,350,631 B2 * | 4/2008 | Furuichi | ............... | F16D 13/683 192/30 W |
| 7,566,287 B2 * | 7/2009 | Onishi | ............... | F16D 25/0638 192/30 W |
| 10,359,087 B2 * | 7/2019 | Jones | ..................... | F16D 55/24 |
| 2009/0177362 A1 | 7/2009 | Schmitt et al. | | |
| 2015/0136559 A1 | 5/2015 | Brumberger et al. | | |

FOREIGN PATENT DOCUMENTS

| | | | |
|---|---|---|---|
| JP | 2008144869 A | 6/2008 | |
| KR | 10 2007 0066000 A | 6/2007 | |

OTHER PUBLICATIONS

PCT/US2019/041148 Written Opinion (dated Oct. 29, 2019) (Year: 2019).*

* cited by examiner

*Primary Examiner* — Colby M Hansen
(74) *Attorney, Agent, or Firm* — Boyle Fredrickson S.C.

(57) ABSTRACT

A power transmission device with a clutch plate wear sensor system includes a power transmission shaft configured to transmit torque and a clutch configured to selectively deliver power into or out of the power transmission shaft. The clutch includes a clutch stack and clutch piston that moves to selectively actuate the clutch stack between an engaged state to deliver power through the clutch and a disengaged state to not deliver power through the clutch. The clutch stack wear sensor system includes at least one detectable element arranged for movement in unison with the clutch piston and a sensor arranged to detect the detectable element and provide a signal indicative of a wear characteristic of the clutch stack.

21 Claims, 6 Drawing Sheets

US 10,914,327 B2

CLUTCH STACK WEAR SENSOR SYSTEM FOR A POWER TRANSMISSION DEVICE

BACKGROUND OF THE INVENTION

1. Field of the Invention

The present invention relates to transmission devices with clutch stacks and, more specifically, to a clutch stack wear sensor system that may measure both the rotational speed of a piston and the displacement of the piston due to wear of the clutch plates within a clutch stack.

2. Discussion of the Related Art

Traditionally, transmission drive shaft rotational speed can be determined with a sensor that determines the rotational speed of the shaft by relaying changes in the magnetic field caused by evenly spaced grooves or ribs disposed on a ferrous component joined to the shaft. A controller can measure the distance between these changes in time and calculate the rotational speed of the shaft based on the circumference of the component. During operation of the transmission, the friction plates within a clutch stack wear and eventually wear to a point of losing torque capacity.

SUMMARY OF THE INVENTION

A clutch wear sensor system is provided that may determine clutch wear based on a signal that corresponds to a position of a detectable element. The detectable element may be on a rotating clutch component, such as a piston that compresses a clutch stack during clutch engagement. The position of the detectable element is indicative of an axial or longitudinal position of the piston within the clutch during an engaged state of the clutch, which corresponds to the amount of wear and therefor thickness of the clutch stack. A sensor within the system detects the detectable element and may provide a signal that may be proportional to clutch wear for detecting clutch wear along a continuum or may provide a go/no-go indication or otherwise indicate one of multiple discrete clutch wear states. The detectable element may be implemented as a defect(s) amongst other detectable elements to produce an anomaly or irregularity within the signal that is recognized by the control system as a wear indication, either as a replacement condition or other worn-state indication that may correspond to an amount of wear for predicting remaining clutch life. This may be done by configuring the detectable elements and sensor to provide a signal(s) that is proportional to wear to facilitate predicting remaining clutch life. Instead of signals that are proportional to wear, the detectable element(s) and sensor may be configured to provide a signal(s) indicative of discrete wear states. In one example, instead of a defect(s), the detectable element may be implemented to produce a signal that itself corresponds to a discrete clutch wear state, which may facilitate providing a go/no-go indication or a replace-soon indication. Such non-defect implementations may include multiple markings or other detectable elements that may be provided in multiple stages or sets, with the different stages providing different signal characteristics that correspond to different wear states of the clutch. Another non-defect implementation may be implemented as a single marking or other detectable element that, when detected, indicates a replacement-needed condition, for example, as a go/no-go indication. The clutch wear sensor system may be implemented along with a rotational speed sensor for both determining shaft rotational speed and also evaluating clutch wear by detecting the same set of detectable elements. Separate sensors may instead be used for determining shaft rotational speed and clutch wear by detecting different sets of detectable elements.

A sensor system is provided that includes a sensor that is configured to interact with a rotating clutch piston to measure both the rotational speed of the piston and the displacement of the piston along the horizontal axis resulting from wear of the clutch stack.

According to one aspect of the invention, as the friction plates of the clutch stack wear, the sensor detects further axial movement of the rotating clutch piston for determining a wear state of the friction plates of the clutch stack.

According to another aspect of the invention, a single sensor element may be arranged to detect both the rotational speed of the output shaft of the transmission and the wear of the friction plates within the clutch stack. By altering the outer surface of a component joined to the output shaft that also applies pressure to the clutch stack, a single sensor may be used to detect both the rotational speed of the output shaft and the wear of the friction plates within the clutch stack based upon its detection of changes in the magnetic field caused by the change in the contour or composition of the outer surface of the component during operation of the transmission.

In accordance with an embodiment of the invention, a power transmission device with a clutch stack wear sensor includes a piston coupled to a power transmission shaft and a clutch configured to selectively deliver power into or out of the power transmission shaft. The clutch includes a clutch stack and a clutch piston that can move to selectively actuate the clutch stack between an engaged state to deliver power through the clutch and a disengaged state to not deliver power to through the clutch. The clutch stack wear sensor system includes at least one detectable element that moves in unison with the clutch piston and a sensor arranged to detect the detectable element and provide a signal indicative of a wear characteristic of the clutch stack.

According to another aspect of the invention, the detectable element includes a plurality of detectable elements spaced around an outer surface of the clutch piston. At least one of the plurality of detectable elements may include a change in geometry. For example, at least one of the plurality of detectable elements may include an angled portion that displaces the at least one detectable element from a first location to a second location offset toward an adjacent detectable element.

According to yet another aspect of the invention, the wear characteristic of the clutch stack may be associated with the piston being in one of an operating position, an intermediate position, and a replacement position. When the sensor detects that the axial location of the piston is in the intermediate position, the sensor is able to track movement of the piston through the intermediate position. Further, the wear characteristic of the clutch stack may be tracked by the movement of the piston through the intermediate position. When the sensor detects that the piston is in the replacement position, a notification may be provided to a user.

According to another aspect of the invention, the at least one detectable element may include a first set of detectable elements associated with the operating position, the intermediate position, and the replacement position of the piston, a second set of detectable elements associated with the intermediate position and the replacement position of the piston, and a third set of detectable elements associated with the replacement position of the piston. When the sensor detects only the first set of detectable elements, it is determined that the piston is in the operating position. When the sensor detects the first and second sets of detectable elements, it is determined that the piston is in the intermediate position. When the sensor detects the first, second, and third sets of detectable elements, it is determined that the piston is in the replacement position.

According to yet another aspect of the invention, the sensor may also detect a rotation speed of the piston by way of the plurality of texture elements. The rotation speed of the piston may be equal to a rotation speed of the power transmission shaft.

In accordance with another embodiment of the invention, a power transmission unit with a sensing system includes a piston coupled to a power transmission shaft, a plurality of detectable elements axially spaced around the outer surface of the piston, and a sensor disposed adjacent the outer surface of the piston to detect the detectable elements during rotation of the piston and power transmission shaft. As friction plates of a transmission clutch stack wear, the piston moves axially along the transmission power shaft. The sensor detects an axial location of the piston by way of the detectable elements and provides a signal indicative of a wear characteristic of the friction plates, while also detecting a rotational speed of the piston by way of the detectable elements.

According to another aspect of the invention, at least one of the detectable elements may include an angled portion oriented at an angle between 0° and 90°. Further, the axial location may be one of an operating position, an intermediate position, and a replacement position. When the sensor detects the axial location of the piston is in the replacement position, a notification may be provided to a user.

According to yet another aspect of the invention, the at least one detectable element may include a first set of detectable elements extending a first axial length along the outer surface of the piston, a second set of detectable elements extending a second axial length along the outer surface of the piston, and third set of detectable elements extending a third axial length along the outer surface of the piston. The operating position of the piston includes the first detectable elements, the intermediate position of the piston includes the first and second detectable elements, and the replacement position of the piston includes the first, second, and third detectable elements In accordance with yet another embodiment of the invention, a power transmission device may include a shaft for transmitting power out of or into the power transmission device, a clutch stack including a plurality of friction plates, a piston coupled to the output shaft and disposed at a second side of the clutch stack, and a sensor disposed adjacent the outer surface of the piston. The piston includes a first side adjacent the clutch plate stack, a second side, and a plurality of detectable elements axially spaced around the outer surface of the piston. As the friction plates of the clutch stack wear, the piston moves axially along the output shaft. The sensor detects the axial location of the piston along a length of the output shaft by way of a characteristic of a signal that corresponds to, for example, a position of at least one of the detectable elements.

According to yet another aspect of the invention, the axial location of the piston is one of an operating position, an intermediate position, and a replacement position. When the sensor detects the axial location in the replacement position, a notification is provided to a user.

According to another aspect of the invention, the power transmission device may also include a piston carrier disposed between and directly coupled to the piston and the output shaft. In addition, the sensor may be coupled to a casing of the power transmission device and extend through an orifice formed therein.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications. Further, although many methods and materials similar or equivalent to those described herein may be used in the practice of the present invention, a few such suitable methods and materials are described in greater detail below.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
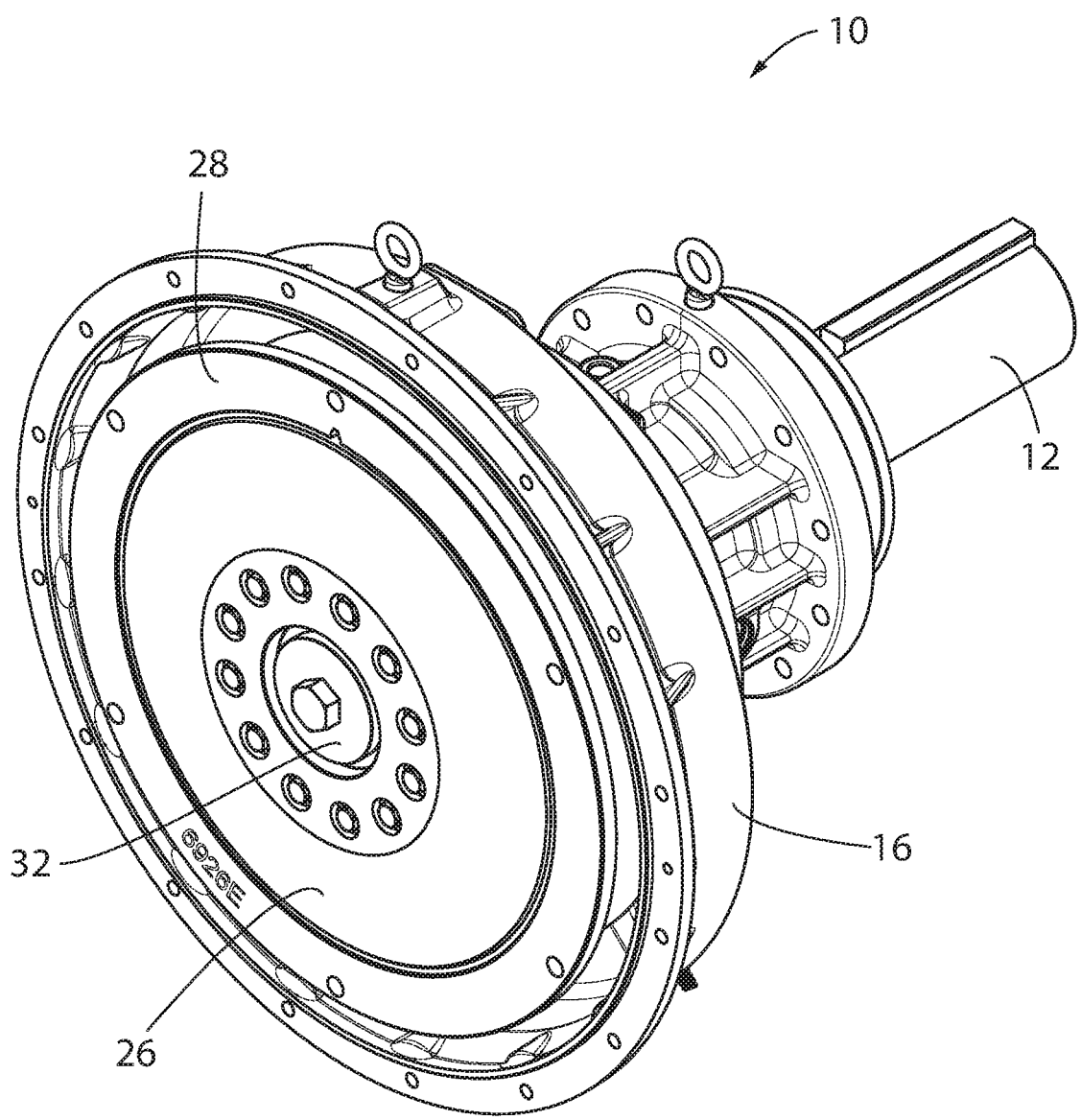
FIG. 1 is a perspective view of a power transmission device, according to an embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF THE DRAWINGS

The present invention and the various features and advantageous details thereof are explained more fully with reference to the non-limiting embodiments described in detail in the following description.

Figure 2:
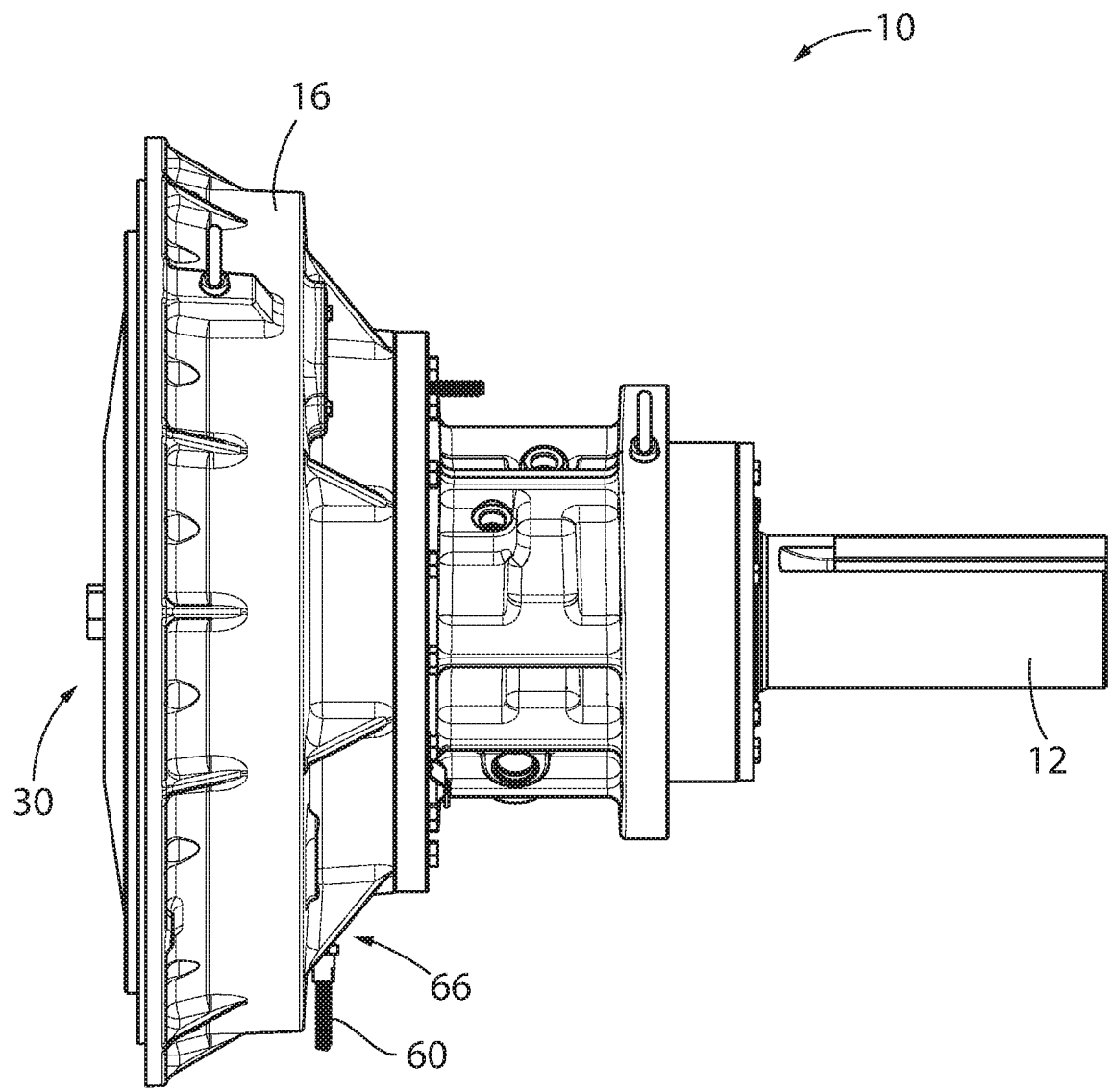
FIG. 2 is a side view of the power transmission device of FIG. 1.
Figure 3:
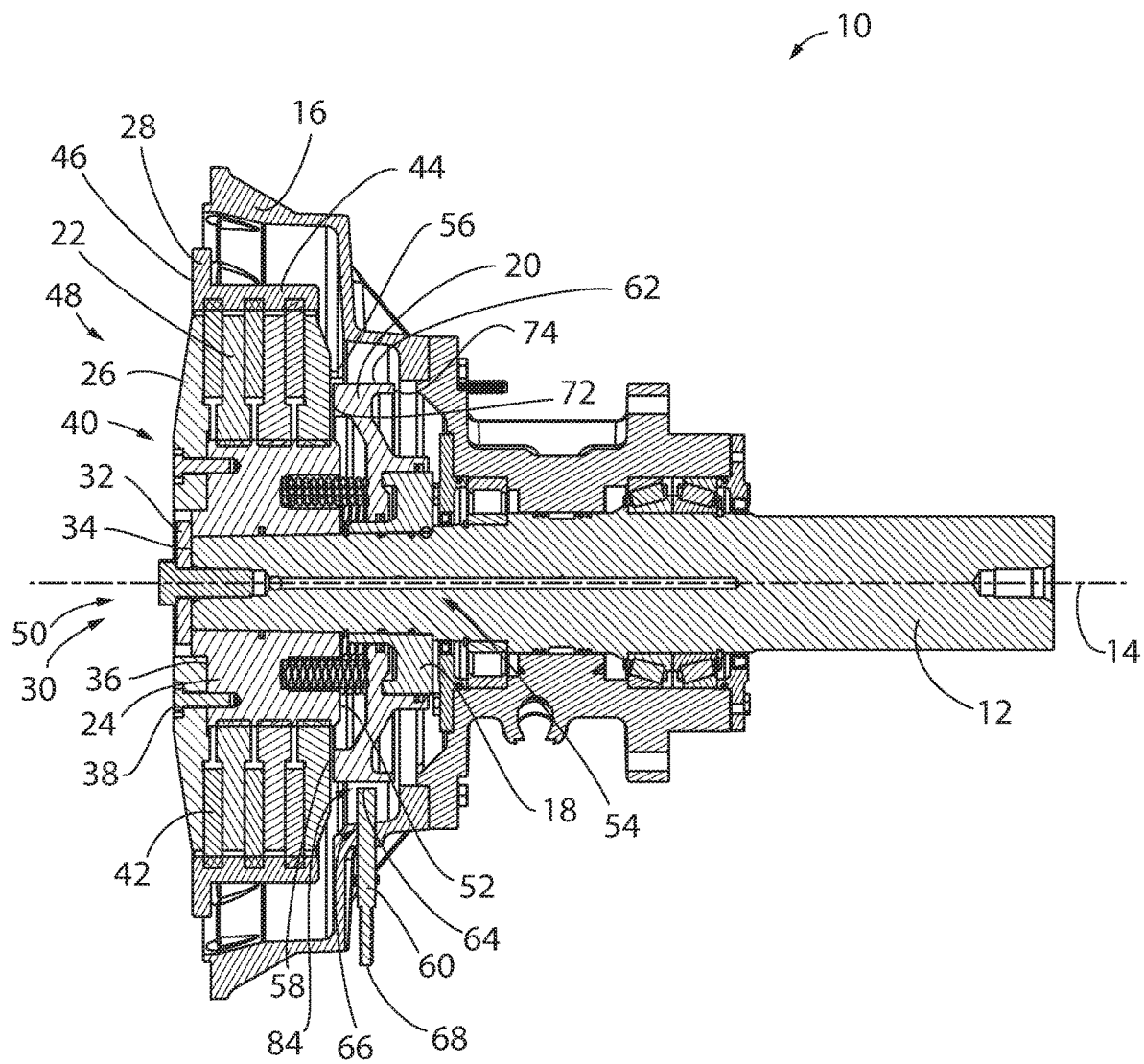
FIG. 3 is a cross-sectional view of the power transmission device of FIG. 2.

First referring to FIGS. 1-3, perspective, side, and cross-sectional views of a power transmission device 10 with a clutch stack wear sensor system are shown. The device 10 may be a PTO (power take off) unit, a PTI (power take in) unit, or other transmission unit. The device 10 includes a power transmission shaft 12 oriented along an axis 14 and configured to rotate about the axis 14 to transmit torque. The shaft 12 may be an output shaft, input shaft, or intermediate shaft 12 depending on whether the device 10 is a PTO unit, a PTI unit, or a transmission unit. The shaft 12 extends into a casing 16 which includes additional elements of the device 10 that can be seen in the cross-sectional view of FIG. 3. For example, the device 10 may also include a piston carrier 18, a clutch piston 20 with a piston body that defines a piston body outer surface, a clutch having a clutch stack 22, a hub 24, a hub plate 26, and drive ring 28 that is configured to transfer power between an outside source such as, but not limited to an internal combustion engine, and the shaft 12 of the power transmission device 10. In turn, the clutch stack 22, in conjunction with piston 20, piston carrier 18, and hub 24, may control movement of the shaft 12 in response to movement of the drive ring 28 to engage and disengage the clutch stack 22 and correspondingly selectively rotate the shaft 12. That is, when the clutch stack 22 is in an engaged state, power is delivered through the clutch. Meanwhile, when the clutch stack 22 is in a disengaged state, power is not delivered through the clutch. The clutch piston 20 moves to selectively actuate the clutch stack 22 between the engaged state and the disengaged state.

Starting at a first end 30 of the device 10, a stop plate 32 is coupled to a first end 34 of the shaft 12. The stop plate 32 has a diameter greater than a diameter of the shaft 12, so as to be in contact with both the first end 30 of the shaft 12 and a first end 36 of hub 24. As a result, the stop plate 32 provides a backstop upon which the hub 24 cannot travel beyond.

The hub plate 26 may then be coupled to the first end 36 of the hub 24 by way of a plurality of fasteners 38, such as, but not limited to, restraining bolts. As shown in FIGS. 1 and 3, the hub plate 26 is annular in shape, and the stop plate 32 is aligned in a center orifice 40 thereof. The hub plate 26 extends from the hub 24 to the clutch stack 22 so as to be in contact with both the first end 36 of the hub 24 and a first end 42 of the clutch stack 22 at a first end of the clutch stack 22 and provide a backstop thereto.

As shown in FIG. 3, the drive ring 28 includes a main portion 44 oriented parallel to the shaft 12 and extending into the casing 16. A flanged portion 46 extends perpendicularly from the main portion 44 at a first end of the drive ring 28. In turn, the flanged portion 46 of the drive ring 28 is configured to be coupled to and receive power from the previously mentioned prime mover. FIGS. 1 and 3 also show the drive ring 28 as annular in shape, and the hub plate 26 as being disposed within a center orifice 48 of the drive ring 28.

The hub 24 is coupled to the shaft 12 adjacent the first end 34 of the shaft 12. The hub 24 is annular in shape and receives the shaft 12 within its center orifice 50. The center orifice 50 is configured to have a diameter equal to or substantially equal to the diameter of the shaft 12, which may include a tapered fit, splined connection, or keyed connection. As a result, rotation of the hub 24 is directly translated to the shaft 12 and vice versa.

The clutch stack 22 includes multiple clutch plates such as multiple friction and smooth plates that are stacked against each other in an alternating pattern. The multiple friction plates are then coupled to the drive ring 28, while the smooth friction plates are coupled to the other of the drive ring 28 and the hub 24, or vice versa. The friction plates coupled to the drive ring 28 therefore rotate with the drive ring 28 and prime mover, while the friction plates coupled to the hub 24 rotate with the hub 24 and shaft 12. When compressed, the friction plates of the clutch stack are pressed against each other and rotation of the drive ring 28 and prime mover is translated to the hub 24 and shaft 12 by way of the clutch stack 22. Compression of the clutch stack 22 for its engagement to rotate the shaft 12 is caused by the piston 20 pushing axially away from the piston carrier 18, which may be done by way of hydraulic or pneumatic pressure.

As previously discussed, the first end 36 of the hub 24 is aligned with the hub plate 26 and the stop plate 32. The piston carrier 18 may be locked into rotational unison with the shaft 12. For example, both the piston carrier 18 and the shaft 12 may include cavities formed therein and configured so that a steel ball may occupy both the cavity of the piston carrier 18 and the cavity of the shift 12. As a result of the steel ball disposed in both the cavity of the piston carrier 18 and the cavity of the shaft 12, the piston carrier 18 and the shaft 12 are locked in rotational unison. In yet other embodiments of the invention, the piston carrier 18 may be coupled to the shaft 12. Further, the piston carrier 18 is disposed at a location adjacent a second end 52 of the hub 24. The piston carrier 18 is annular in shape with a center orifice 54 having a diameter equal to or substantially equal to that of the shaft 12. In addition, the piston carrier 18 may be axially fixed in position along the length of the shaft 12 to provide a structure away from which the piston 20 is biased to engage the clutch stack 22.

The piston 20 is concentrically seated on the piston carrier 18 with an inner circumferential surface of the piston 20 engaging an outer surface of an inner collar of the piston carrier and a rearwardly extending collar of the piston 20 engaging an outer flange of the piston carrier 18 in a manner that allows the piston 20 to axially slide relative to the piston carrier 18. Piston 20 is aligned with a second end 56 of the clutch stack 22 at a second side of the clutch stack 22. In particular, the piston 20 is configured to rotate and move axially along the length of the shaft 12 and the piston carrier 18. When the piston 20 moves axially toward the clutch stack 22, a first end 58 of the piston 20 is in direct contact with the clutch stack 22 and exerts a force on the clutch stack 22. As such, the clutch stack 22 is compressed by movement of the piston 20 toward the clutch stack 22 and clutch stack 22 engages.

As described above, the rotation of the shaft 12 is translated from the rotation of hub through the engages clutch stack 22 when the piston 20 is pushed away from the piston carrier 18. As a result, the hub 24 and piston 20 rotate at the same speed as the shaft 12. FIG. 3 illustrates a clutch stack wear sensor system with a sensor 60 arranged to detect features of the piston 20 while the piston 20 rotates and provide a signal relating to the detectable features. These features will be described in further detail below with respect to detectable features 70. Sensor 60 is shown here disposed perpendicular to the piston body outer surface, represented here as outer surface 62 of the piston 20 and is adjacent thereto, so that an end 64 of the sensor 60 is spaced apart from the outer surface 62 of the piston 20. In other embodiments of the invention, the sensor 60 may be disposed at angles other than perpendicular to outer surface 62 of the piston 20.

As shown in FIG. 2, the sensor 60 is secured to and extends through the casing 16 of the device 10 in order to properly space apart the end 64 of the sensor 60 and the outer surface 62 of the piston 20. The sensor 60 extends from the first end 64 within the casing 16, through an orifice 66 in the casing 16, and to a second end 68 within the external environment. By extending into the external environment, the sensor 60 is able to be manipulated by a user to adjust the spacing between the first end 64 of the sensor 60 and the outer surface 62 of the piston 20. In addition, a user may remove and replace the sensor 60 without having to deconstruct the device 10.

Figure 4:
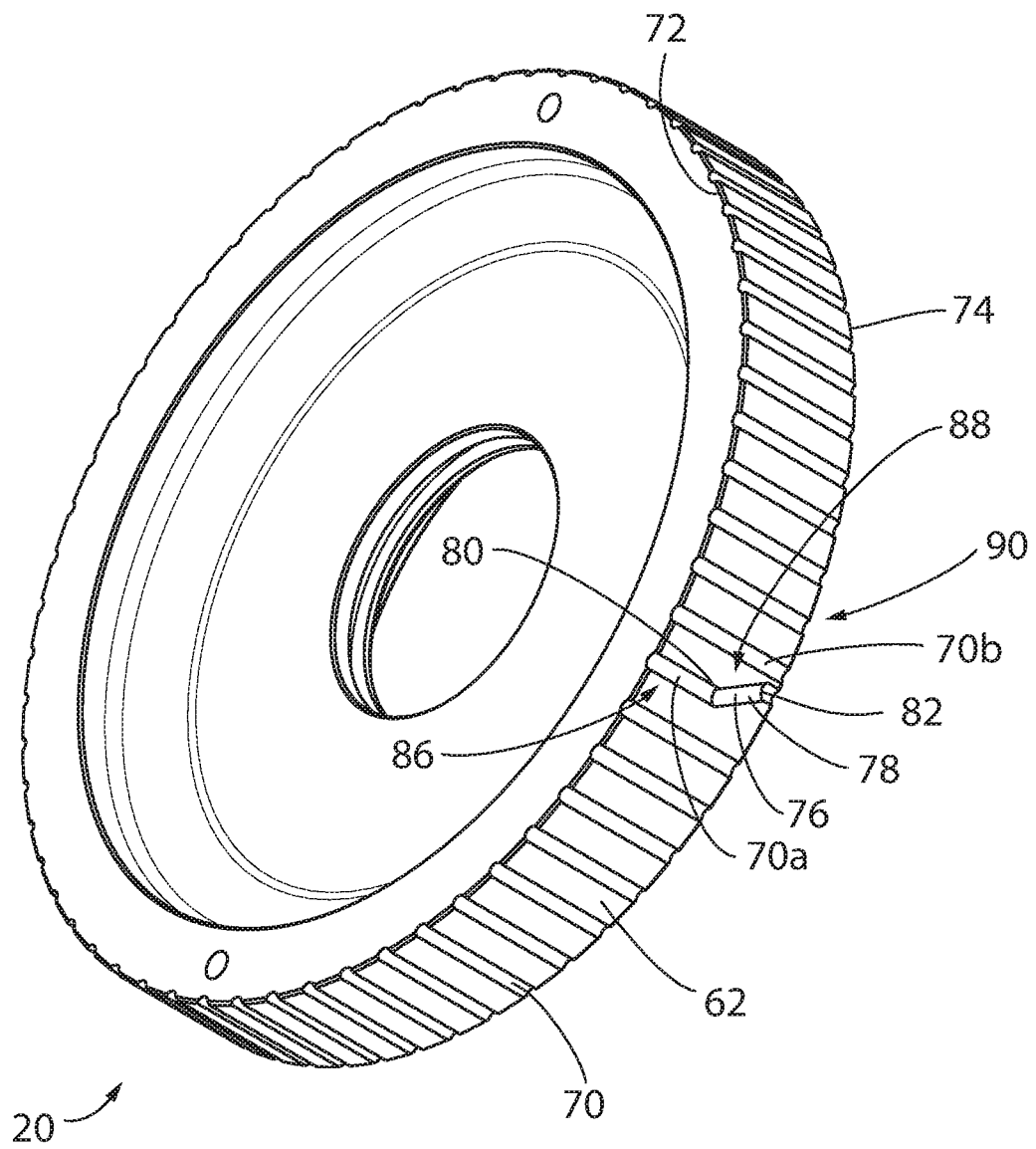
FIG. 4 is a perspective view of a piston used within the power transmission device of FIG. 1, according to an embodiment of the invention.

The piston body has various features that can be detected by the sensor 60 for determining rotational speed of shaft 12 and the condition or wear state of clutch stack 22. As shown in FIG. 4, the piston 20 includes a series of detectable elements 70 equally spaced along the outer surface 62 of the piston 20. In other embodiments of the invention, the piston 20 may include a single detectable element 70 or any other number of detectable elements 70. The detectable elements 70 extend from a first end 72 of the outer surface 62 of the piston 20, which is adjacent the clutch stack 22, to a second end 74 of the outer surface 62 of the piston 20. When the piston 20 rotates, a magnetic field is created due to the material composition of the piston 20. The magnetic field is changed at each detectable element 70 due to the change in the contours or material of the outer surface 62 of the piston 20, which is made from a ferrous or other material that can be detected by sensor 60. As described above, the sensor 60 is oriented perpendicular to the outer surface 62 of the piston 20, while also having its first end 64 spaced apart and located adjacent to the outer surface 62 of the piston 20. As such, the sensor 60 is able to detect the changes in the magnetic field resulting from the detectable elements 70. In turn, the rotation speed of the piston 20, piston carrier 18, and shaft 12 can be calculated from the distance between detectable elements 70, time between detected change in magnetic field, and the circumference of the piston 20. In other embodiments of the invention, the sensor 60 may be oriented at an angle other than perpendicular to the outer surface 62 of the piston 20. In particular, the sensor 60 may be oriented at any angle allowing the sensor 60 to detect the change in magnetic field.

At least one of the detectable elements 70 may include a defect 76 disposed adjacent the second end 74 of the outer surface 62 of the piston 20. As the friction plates of the clutch stack 22 wear, the piston 20 moves further axially along the length of the shaft 12 closer to the first end 34 of the shaft 12 to compress the clutch stack 22. That is, the thickness of the clutch stack 22 is reduced as the friction plates of the clutch stack 22 wear, resulting in the piston 20 needing to move closer to the first end 34 of the shaft 12 to properly compress the clutch stack 22.

When the clutch stack 22 includes new friction plates, the sensor 60 is aligned with the outer surface 62 of the piston 20 closer to the first end 72 of the outer surface 62 of the piston 20 when clutch stack 22 is compressed. As the friction plates of the clutch stack 22 wear and the piston 20 moves toward the first end 34 of the shaft 12 when clutch stack 22 is compressed, the sensor 60 maintains its same horizontal position. As a result, as the friction plates of the clutch stack 22 wear, the sensor 60 becomes aligned with the outer surface 62 of the piston 20 at a location transitioning away from the first end 72 of the outer surface 62 of the piston 20 and transition toward the second end 74 of the outer surface 62 of the piston 20. That is, the sensor 60 moves relative to the piston 20 along a length of the outer surface 62 of the piston 20. For example, FIG. 3 illustrates a wear state of the friction plates of the clutch stack 22 wherein the sensor 60 is aligned at a location centrally located between the first and second ends 72, 74 of the outer surface 62 of the piston 20. A control system with a controller such as an industrial computer with a controller that may include an industrial computer or, e.g., a programmable logic controller (PLC), along with corresponding software and suitable memory for storing such software and hardware including interconnecting conductors for power and signal transmission between the control system, sensor 60, and/or other components of device 10 is configured to evaluate signals from sensor 60 based on the textured elements to determine the rotational speed of shaft 12 and based on defect(s) 76 to determine a condition or wear state of the clutch stack 22.

As the friction plates of the clutch stack 22 become substantially worn and need to be replaced, the sensor 60 becomes aligned with the outer surface 62 of the piston 20 at a location adjacent the second end 74 of the outer surface 62 of the piston 20. When the sensor 60 becomes aligned with the defect 76 on the outer surface 62 of the piston 20, a change in the magnetic field associated with the defect 76 will be detected by the sensor 60. In turn, a notification may be made to notify a user that the friction plates of the clutch stack 22 are substantially worn and need to be replaced, for example, through a visual, audible, and/or other notification through a user interface. The control system recognizes the signal anomaly or discontinuity created by the defect(s) 76, indicating a worn state of clutch stack 22, which differs from the consistent signal that would otherwise be produced by a constant speed rotation of the shaft 12.

In the representative embodiment of the invention shown in FIG. 4, the defect 76 may be incorporated into at least one of the detectable elements 70 of the outer surface 62 of the piston 20. However, in other embodiments of the invention, the defect 76 may be independently formed into the outer surface 62 of the piston, separate from the detectable elements 70.

Next, FIG. 4 depicts a perspective view of the piston 20 to further illustrate the detectable elements 70 and defect 76 described above. As shown, the detectable elements 70 are evenly spaced around the outer surface 62 of the piston 20. While the representative embodiment of the invention illustrates the detectable elements 70 as extending from the first end 72 of the outer surface 62 to the second end 74 of the outer surface 62, it is contemplated that the detectable elements 70 may terminate at locations at or adjacent the first and second ends 72, 74 of the outer surface 62. In addition, while the detectable elements 70 are illustrated as texture elements such as grooves formed into the outer surface 62 of the piston 20, it is also contemplated that the detectable elements 70 may be texture elements such as ribs or teeth raised from the outer surface 62 of the piston 20. In yet other embodiments of the invention, the detectable elements 70 may be a magnetic or ferrous material different from the piston 20 so as to affect the magnetic field and be detectable by the sensor 60. In such instances, the detectable elements 70 may be disposed within the piston 20 to be flush with the outer surface 62 of the piston 20. Similarly, the defect 76 may be a texture element such as that described above or a magnetic or ferrous material flush with the outer surface 62 of the piston 20.

FIG. 4 further illustrates the defect 76 as being a portion of one of the detectable elements 70. For example, the defect 76 may be an angled portion 78 of at least one of the detectable elements 70. The angled portion 78 of the detectable element 70a is designed to transition the detectable element 70a from its initial location 80 to an offset location 82 closer to an adjacent detectable element 70b. The angled portion 78 begins at the initial location 80 at or adjacent to a center 84 of the outer surface 62 of the piston 20, while the ending at the offset location 82 at or adjacent to the second end 74 of the outer surface 62 of the piston 20.

While FIG. 4 illustrates the angled portion 78 as extending from the initial location 80 at approximately a 30° angle, it is contemplated that the angled portion 78 may extend from the initial location 80 at any angle, including, but not limited to, between 0° and 90°. For example, the angled portion 78 may be oriented at a 90° angle. It is contemplated that the location of the initial location 80 transitions from adjacent the center 84 of the outer surface 62 of the piston 20 to adjacent the second end 74 of the outer surface 62 of the piston 20 as the angle of the angled portion 78 increases. For example, if the angled portion 78 were oriented at a 90° angle, the initial location 80 would be closer to the second end 74 of the outer surface 62 of the piston 20 than if the angled portion 78 were oriented at a 30° angle.

As the piston 20 moves axially toward the first end 34 of the shaft 12 as the friction plates wear, the sensor 60 is able to detect and provide a signal indicative of the axial location of the piston 20 based on the defect 76 and, as a result, the wear characteristic of the clutch stack 22. When the sensor 60 is aligned at a location between the first end 72 of the outer surface 62 and the initial location 80 of the detectable element 70, the sensor 60 may detect the axial location of the piston as being at an operating position 44. The operating position 86 being designated as a position associated with the friction plates of the clutch stack 22 having acceptable wear. In the operating position 86, the sensor 60 does not detect adjustments to the magnetic field other than the changes associated with the detectable elements 70 for measuring rotation speed.

When the sensor 60 is aligned at a location along the angled portion 78 between the initial location 80 and the offset location 82, the sensor 60 may detect the axial location of the piston 20 as being at an intermediate position 88. The intermediate position 88 being designated as a position associated with the friction plates of the clutch stack 22 having significant wear but still being serviceable. In the intermediate position 88, the sensor 60 is able to detect its position along the angled portion 78 from the initial location 80 to the offset location 82 due to the adjustment to the change of magnetic field associated with the changing of the distance between the detectable element 70a and the adjacent detectable element 70b as detected by the sensor 60. As such, the sensor 60 is able to track the movement of the piston 20 through the intermediate position 88. In addition, the sensor 60 is able to determine the rate at which it moves from the initial location 80 and the offset location 82, which relates to the rate at which the friction plates of the clutch stack 22 wear. In turn, a prediction can be made as to when the friction plates of the clutch stack 22 will wear to the point that the sensor 60 is aligned with the offset location 82.

When the sensor 60 is aligned with the offset location 82, the sensor 60 may detect the axial location of the piston 20 as being at a replacement position 90. The replacement position 90 being designated as a position associated with the friction plates of the clutch stack 22 needing replacement due to wear. In the replacement position 90, the sensor 60 detects the location of the angled portion 78 at the offset position 82 by detecting the adjustment to the magnetic field resulting from the detectable element 70a being disposed at the offset position 82.

As described above, the angled portion 78 may be oriented at any angle in varying embodiments of the invention. The change in angle of the angled portion 78 across embodiments of the invention results in adjustments of the intermediate position 88. As stated above, in embodiments of the invention having the angled portion 78 oriented at a larger angle, the initial location 80 is located closer to the second end 74 of the outer surface 62 of the piston 20. As a result, the axial position of the piston 20 would be detected as being in the intermediate position 88 for a shorter period of time. In instances where the angled portion 78 is oriented at a 90° angle, the initial location 80 and the offset location 82 would be equally adjacent the second end 74 of the outer surface 62 of the piston 20. As a result, there would be no intermediate position 88, as the axial position would transition from the operating position 86 to the replacement position 90. In another alternative embodiment of the invention, the initial location 80 may be at the first end 72 of the outer surface 62 of the piston 20 and the offset location 82 may be at the second end 74 of the outer surface 62 of the piston 20. As a result, the angled portion 78 would extend from the first end 72 to the second end 74 of the outer surface 62 of the piston 20. The operating position 86 would then be aligned with the first end 72 of the outer surface 62 of the piston 20, the replacement position 90 would be aligned with the second end 74 of the outer surface 62 of the piston 20, and the intermediate position 88 would extend from the first end 72 to the second end 74 of the outer surface 62 of the piston 20.

Figure 5:
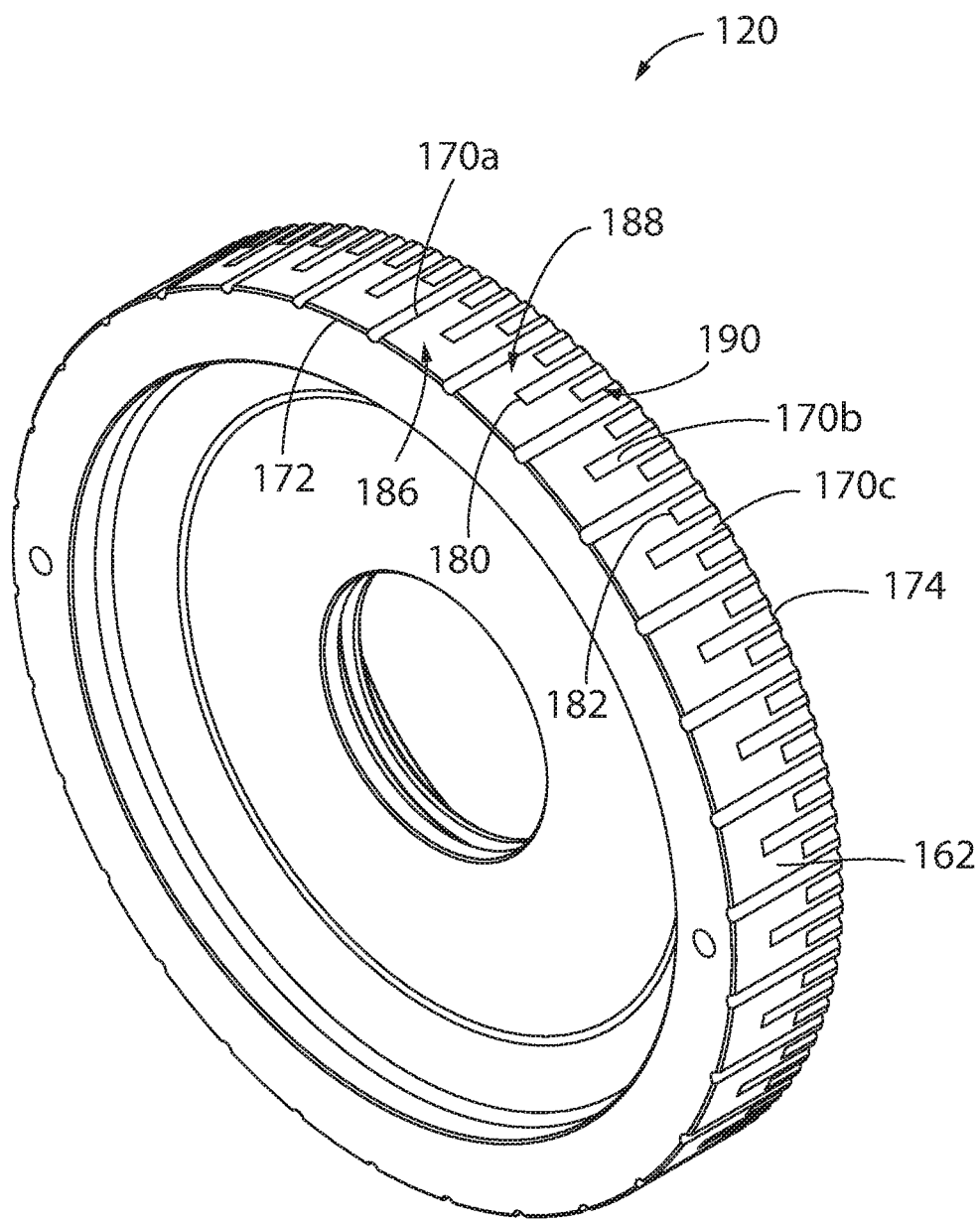
FIG. 5 is a perspective view of a piston usable with the power transmission device of FIG. 1, according to another embodiment of the invention.
Figure 6:
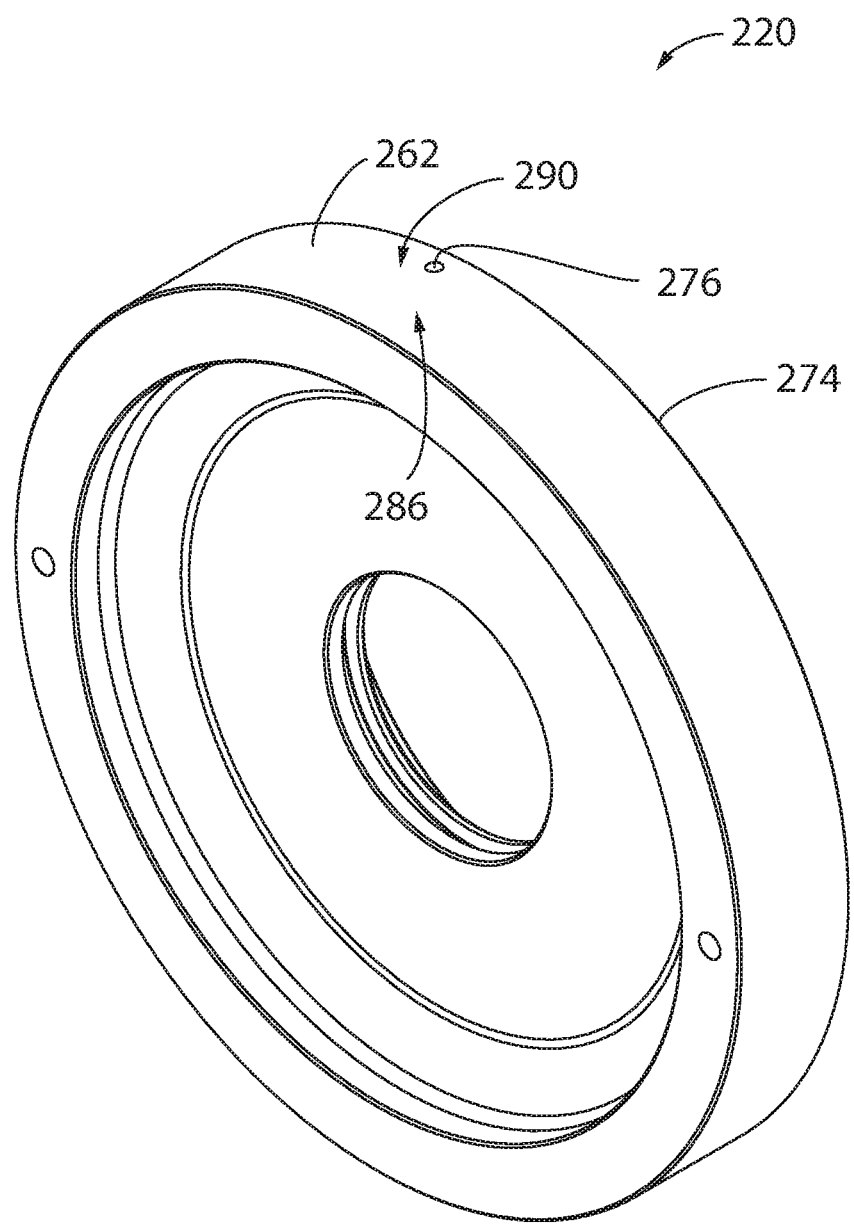
FIG. 6 is a perspective view of a piston usable with the power transmission device of FIG. 1, according to yet another embodiment of the invention.

FIGS. 5 and 6 show implementations that may be implemented without defects that cause signal irregularities within an otherwise existing signal, for example, a rotational speed signal. Instead, these detectable elements may be detected without the rotational speed sensor, but instead by some other sensor or mechanism such as a dedicated wear sensor or secondary sensor. Referring specifically to FIG. 5, a piston 120 is shown according to an alternative embodiment of the invention that implements non-defect detectable elements. The piston 120 includes a first set of detectable elements 170a, a second set of detectable elements 170b, and a third set of detectable elements 170c spaced around an outer surface 162 of the piston 120. The first, second, and third sets of detectable elements 170a, 170b, 170c can provide different signal characteristics relative to, for example, rotational speed that is measured at some other location in the device 10 (FIG. 1) to define the clutch wear state. Similar to detectable elements 70 described above, the detectable elements 170a, 170b, 170c may be raised or lowered textured elements or alternative magnetic or ferrous materials. As shown in FIG. 5, the first set of detectable elements 170a may be longer than the others, for example, may extend between a first end 172 and a second end 174 of the outer surface 162 of the piston 120. Detection of only the first set of detectable elements 170a corresponds to an acceptable wear state of the clutch. The second set of detectable elements 170b may be shorter than those of the first set 170a and extend from an initial location or second set outer ends 180 at an intermediate segment of the piston toward the second end 174 of the outer surface 162 of the piston 120. Detection of the first and second sets of detectable elements 170a, 170b provides a signal with a higher frequency at a given rotational speed than only the first set of detectable elements 170a, for example, double or some other multiple of the frequency, which corresponds to a nearing-replacement-needed condition or service soon indication as the wear state of the clutch. The third set of detectable elements 170c may be shorter than those of both the first and second sets 170a, 170b and extend from an offset location or third set outer ends 182 toward the second end 174 of the outer surface 162 of the piston 120. Detection of the first, second, and third sets of detectable elements 170a, 170b, 170c provides a signal with an even higher frequency at a given rotational speed than only the first set of detectable elements 170a, for example, quadruple or some other multiple of the frequency, which corresponds to a replacement-needed condition or service now indication as the wear state of the clutch.

Still referring to FIG. 5, as the piston 120 moves axially toward the first end 34 of the shaft 12 the sensor 60 is able to detect the axial location of the piston 120 based on which of the first, second, and third sets of detectable elements 170a, 170b, 170c are detected. When sensor 60 (FIG. 3) is implemented as a secondary sensor or wear sensor that that detects the detectable elements 170a, 170b, 170c without being used in a rotational speed determination, the sensor's 60 signal(s) may be compared with a signal(s) from a different rotational speed sensor to determine how many detectable elements or which set(s) is being detected at a given rotational speed. This comparison allows the system to determine which of the first, second, and third sets of detectable elements 170a, 170b, 170c are being detected and therefore the axial location of the piston 120. In an acceptable wear state of the clutch, the piston 120 fully engages the clutch and is arranged with respect to the sensor 60 (FIG. 3) so that only the first set of detectable elements 170a are detected at an operating position 186 as an indication that the friction plates of the clutch stack 22 have acceptable wear. In a service or repair soon state of the clutch, the piston 120 fully engages the clutch and is arranged with respect to the sensor 60 (FIG. 3) so that both the first and second sets of detectable elements 170a, 170b, are detected at an intermediate position 188 as an indication that the friction plates of the clutch stack 22 may have significant wear but are still usable. In a service or repair immediately state of the clutch, the piston 120 fully engages the clutch and is arranged with respect to the sensor 60 (FIG. 3) so that all of the first, second, and third sets of detectable elements 170a, 170b, 170c are detected at a replacement position 190 as an indication that the friction plates of the clutch stack 22 needing replacement due to wear.

Next, FIG. 6 depicts another embodiment of the invention having a piston 220 with a single detectable element(s) 276 which may be detectable by sensor 60 (FIG. 3) to provide a discrete clutch state determination such as a go/no-go indication or a service soon indication. Although shown as a single detectable element 276, multiple detectable elements 276 may be provided to facilitate the same determination, whereby detection of element(s) 276 corresponds to the discrete clutch state. In such embodiments of the invention, the detectable element 276 may be an independent textured or other detectable element disposed on an outer surface 262 of the piston 220, shown here adjacent a second end 274 thereof, which corresponds to a replacement position 290. In such an embodiment of the invention, the detection of the detectable element 276 may be used to indicate the immediate change from of an axial position 280 from an acceptable state or operating position 286 to a service-needed state or the replacement position 290 without monitoring the axial position of the piston through an intermediate position, which may be used in a go/no-go determination.

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. A power transmission device with a clutch stack wear sensor system, comprising:
   a power transmission shaft that is configured to transmit torque;
   a clutch that is configured to selectively deliver power into or out of the power transmission shaft, the clutch including:
      a clutch stack that defines an engaged state to deliver power through the clutch and a disengaged state to not deliver power through the clutch;
      a clutch piston that can move to selectively actuate the clutch stack between the engaged and disengaged states; and
   wherein the clutch stack wear sensor system includes:
      at least one detectable element arranged for movement in rotational unison with the clutch piston;
      a sensor arranged to detect the detectable element and provide a signal providing multiple signal components, including:
         a speed signal component corresponding to a rotational speed of the piston; and
         a wear signal component presenting an anomaly of rotational speed indicative of a wear characteristic of the clutch stack.

2. The power transmission device of claim 1 wherein the detectable element includes a plurality of detectable elements spaced around an outer surface of the clutch piston.

3. The power transmission device of claim 2 wherein at least one of the plurality of detectable elements includes an angled portion to displace the at least one detectable element from a first location to a second location, the second location being offset toward an adjacent detectable element.

4. The power transmission device of claim 1 wherein the wear characteristic of the clutch stack is associated with the piston being in one of an operating position and a replacement position.

5. The power transmission device of claim 1 wherein the wear characteristic of the clutch stack is associated with the piston being in one of an operating position, an intermediate position, and a replacement position.

6. The power transmission device of claim 5 wherein the sensor is able to track movement of the piston through the intermediate position.

7. The power transmission device of claim 6 wherein the wear characteristic of the clutch stack is tracked by the movement of the piston through the intermediate position.

8. The power transmission device of claim 5 wherein the at least one detectable element includes:
   a first set of detectable elements associated with the operating position, the intermediate position, and the replacement position of the piston;
   a second set of detectable elements associated with the intermediate position and the replacement position of the piston; and
   a third set of detectable elements associated with the replacement position of the piston.

9. The power transmission device of claim 5 wherein a notification is provided when the sensor detects the piston as being in the replacement position.

10. The power transmission device of claim 5 wherein a notification is continuously provided in response to the signal, the notification indicating the wear characteristic.

11. The power transmission device of claim 1 wherein the sensor further detects a rotation speed of the piston by way of the at least one detectable element.

12. The power transmission device of claim 11 wherein the at least one detectable element comprises a groove formed in an outer surface of the piston.

13. A power transmission device with a speed sensing system and a clutch wear sensing system, the power transmission device comprising:
   a piston coupled to and rotating in unison with a power transmission shaft of the power transmission device, the piston having an outer surface and a plurality of detectable elements axially spaced around the outer surface thereof;

a sensor arranged with respect to the outer surface of the piston for detecting the detectable elements rotating past the sensor during rotation of the piston and the power transmission shaft;

wherein the piston moves axially along the power transmission shaft as friction plates of a clutch stack wear;

wherein the sensor detects an axial location of the piston by way of detecting the detectable elements rotating past the sensor and provides a signal indicative of a wear characteristic of the friction plates of the clutch stack; and wherein the sensor detects a rotation speed of the piston and the power transmission shaft by way of detecting the plurality of detectable elements rotating past the sensor.

14. The power transmission device of claim 13 wherein the plurality of detectable elements includes a detectable element having an angled portion oriented at an angle between 0° and 90°.

15. The power transmission device of claim 13 wherein an axial location of the piston corresponds to at least one of an operating position, an intermediate position, and a replacement position.

16. The power transmission device of claim 15 wherein a notification is provided when the sensor detects the axial location of the piston as being in the replacement position.

17. The power transmission device of claim 13 wherein the plurality of detectable element includes a first set of detectable elements extending a first axial length along the outer surface of the piston, a second set of detectable elements extending a second axial length along the outer surface of the piston, and third set of detectable elements extending a third axial length along the outer surface of the piston; and wherein an operating position of the piston includes the first set of detectable elements, an intermediate position of the piston includes the first and second sets of detectable elements, and a replacement position of the piston includes the first, second, and third sets of detectable elements.

18. A power transmission device comprising:

a shaft for transmitting power out of or into the power transmission device;

a clutch stack having a first side and a second side, the clutch stack including a plurality of friction plates;

a piston disposed adjacent the second side of the clutch stack and configured to selectively actuate the clutch stack between an engaged state and a disengaged state, the piston comprising:

a first side and a second side, the first side of the piston adjacent the second side of the clutch stack;

a plurality of detectable elements spaced from each other around an outer surface of the piston;

wherein the piston moves axially along the shaft as the friction plates of the clutch stack wear; and a sensor arranged to detect the axial position of the piston by way of detecting the detectable elements rotating in unison with the piston and providing a signal indicative of the axial position of the piston and a wear characteristic of the friction plates of the clutch stack as a function of relative positions of the rotating detectable elements with respect to each other and the sensor.

19. The power transmission device of claim 18 wherein the axial position of the piston is one of an operating position, an intermediate position, and a replacement position.

20. The power transmission device of claim 19 wherein a notification is provided when the sensor detects the piston in the replacement position.

21. The power transmission device of claim 18 wherein the sensor is removably coupled to a casing of the power transmission device and extends through an orifice formed therein.

* * * * *